United States Patent
Vangeel et al.

(10) Patent No.: US 9,497,836 B2
(45) Date of Patent: Nov. 15, 2016

(54) LIGHTING SYSTEM FOR ILLUMINATING AN ENVIRONMENT AND A METHOD OF STARTING AN INSTALLATION OF A PROGRAM ON A PROGRAMMABLE CONTROLLER

(71) Applicant: KONINKLIJKE PHILIPS N.V., Eindhoven (NL)

(72) Inventors: Jurgen Mario Vangeel, Beerse (BE); Markus Wilhelmus Maria Coopmans, Helden (NL); Wijnand Johannes Rietman, Eindhoven (NL); John André Van Beurden, Tilburg (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/436,201

(22) PCT Filed: Jun. 4, 2014

(86) PCT No.: PCT/EP2014/061559
§ 371 (c)(1),
(2) Date: Apr. 16, 2015

(87) PCT Pub. No.: WO2014/195347
PCT Pub. Date: Dec. 11, 2014

(65) Prior Publication Data
US 2016/0081160 A1     Mar. 17, 2016

(30) Foreign Application Priority Data
Jun. 4, 2013  (EP) .................................. 13170353

(51) Int. Cl.
*H05B 37/02*     (2006.01)

(52) U.S. Cl.
CPC ........ *H05B 37/029* (2013.01); *H05B 37/0227* (2013.01); *H05B 37/0245* (2013.01)

(58) Field of Classification Search
CPC ............ H05B 37/029; H05B 37/0227; H05B 37/0245
See application file for complete search history.

(56) References Cited

U.S. PATENT DOCUMENTS

2007/0268151 A1  11/2007  Juen et al.
2008/0136334 A1   6/2008  Robinson
(Continued)

FOREIGN PATENT DOCUMENTS

EP    2445227 A1    4/2012
IN    201105638 A   11/2012
(Continued)

*Primary Examiner* — Jany Richardson (57) ABSTRACT

A lighting system (100) for illuminating an environment and a method of starting the installation of a program on a programmable controller of a lighting module are provided. The lighting system (100) comprises a particular lighting module (110), a neighboring lighting module (120) and an installation decision generator (112). A portion of the environment is illuminated by both lighting modules (110, 120). Both lighting modules (110, 120) have a programmable controller (114, 124) and may receive a program via a network interface for installation on the programmable controller (114, 124). The installation decision generator (112) decides whether the installation of the program on the particular lighting module (110) may start, based on operational information as to whether the light emission capabilities of the neighboring lighting module (120) enable illumination of the portion of the environment to be sufficiently close to a desired illumination of the portion.

20 Claims, 7 Drawing Sheets

(56) References Cited

U.S. PATENT DOCUMENTS

| | | | |
|---|---|---|---|
| 2008/0265799 A1* | 10/2008 | Sibert | H05B 37/0245 315/292 |
| 2009/0302782 A1 | 12/2009 | Smith | |
| 2011/0178650 A1 | 7/2011 | Picco | |
| 2011/0254445 A1 | 10/2011 | Bachhuber | |
| 2013/0285558 A1* | 10/2013 | Recker | H02J 9/02 315/153 |
| 2014/0028199 A1* | 1/2014 | Chemel | H05B 33/0854 315/152 |
| 2015/0342008 A1* | 11/2015 | Bergmans | H05B 37/0245 315/294 |

FOREIGN PATENT DOCUMENTS

| | | |
|---|---|---|
| WO | 2013002629 A1 | 1/2012 |
| WO | 2012112813 A2 | 8/2012 |

* cited by examiner

LIGHTING SYSTEM FOR ILLUMINATING AN ENVIRONMENT AND A METHOD OF STARTING AN INSTALLATION OF A PROGRAM ON A PROGRAMMABLE CONTROLLER

CROSS-REFERENCE TO PRIOR APPLICATIONS

This application is the U.S. National Phase application under 35 U.S.C. §371 of International Application No. PCT/EP14/061559, filed on Jun. 4, 2014, which claims the benefit of European Patent Application No. 13170353.0, filed on Jun. 4, 2013. These applications are hereby incorporated by reference herein.

FIELD OF THE INVENTION

The invention relates to a lighting system comprising lighting modules provided with a programmable controller.

The invention further relates to a method of starting an upgrade of a program of a programmable controller of a particular lighting module.

BACKGROUND OF THE INVENTION

In modern lighting systems, lighting modules may comprise a programmable controller which controls the operation of the lighting module. This operation comprises, for example, the controlling of the light emission of a light source of the lighting module. The lighting modules with the programmable controller may be connected to a network and they may receive an update of the program that is executed by the programmable controller.

Published patent application US2007/0268151A1 relates to such a lighting system and discloses a method of programming a lighting device. The method is used to program an operation of a lighting device that comprises a light source. The lighting device comprises firmware and an interface for receiving external control commands for operating the light source. This method includes at least partially programming the firmware of the operating device or the interface by transmitting additional information to the interface.

In the above cited patent application it is suggested that the new firmware may be transmitted without interrupting the normal operation of the lighting device. In practical embodiments, the installation of the new firmware cannot be done while the lighting device is fully operational. Today, lighting devices are switched towards an upgrading operational mode in which the light sources are often switched off. Switching off the light sources is very inconvenient in many situations and in specific situations even undesirable when a minimum lighting level must be guaranteed. For example, in a road tunnel it is undesirable that during normal operation of the road tunnel the light sources are switched off for installing new software in the lighting modules.

SUMMARY OF THE INVENTION

It is an object of the invention to provide a lighting system with lighting modules that comprise a programmable controller, wherein the lighting system is better capable to provide a sufficient functionality even when upgraded software must be installed in a particular lighting module.

A first aspect of the invention provides a lighting system for illuminating an environment. A second aspect of the invention provides a method of starting an upgrade of a program of a programmable controller of a particular lighting module. A third aspect of the invention provides a computer program. Advantageous embodiments are defined in the dependent claims.

According to a first aspect of the invention, a lighting system is provided. The lighting system is used for illuminating an environment. The lighting system in accordance with the first aspect of the invention comprises a plurality of lighting modules and an installation decision generator. The lighting modules comprise a lighting source for emitting light, a programmable controller for controlling an operation of the light source and a network interface for allowing the lighting module to communicate with other lighting modules and/or devices of the lighting system via a network. The lighting modules are configured to receive a program for the programmable controller via the network interface and they are configured to install the program on the programmable controller in dependence on a program installation decision. The plurality of lighting modules comprises a particular lighting module and at least one neighboring lighting module. The neighboring light emitting module is arranged to illuminate together with the particular lighting module a portion of the environment that is to be illuminated. The installation decision generator is used for generating a program installation decision to start the installation of the program on the programmable controller of the particular lighting module. The installation decision generator is configured to obtain operational information relating to a light emission operation of the neighboring lighting module and bases the program installation decision on information, comprising the obtained operational information, as to whether illumination of a portion of the environment will be sufficiently close to a desired illumination of said portion of the environment during the period of time that the program is being installed.

In many lighting systems, a portion of the environment that is to be illuminated receives, directly or indirectly, light from two or more lighting modules, such as from the particular lighting module and the neighboring lighting module. As discussed previously, when the particular lighting module has to start an update of the program of the programmable controller, the particular lighting module is not fully operational anymore, which often results in switching off the light source of the lighting module, or controlling the amount of emitted light to a particular fixed level. This may result in situations where the portion of the environment that is to be illuminated is not sufficiently illuminated anymore. For example, when the light source is switched off, the illumination level may become too low. In another example, when the desired illumination of the portion of the environment is dynamically controlled, fixing the amount of emitted light to a particular fixed level may result in incapability of the lighting system to follow such dynamically controlled illumination patterns and, consequently, in the possibility of too low a level of illumination or too high a level of illumination. In the lighting system according to the invention, the installation decision generator takes into account operational lighting information of the neighboring lighting module when generating (or not generating) the program installation decision to start the installation of the program of the programmable controller of the particular lighting module, to prevent that the lighting system is unable to sufficiently illuminate the portion of the environment that is to be illuminated. Thus, when the operational information of the neighboring lighting module indicates that the neighboring lighting module is, for example, broken or is updating its own software, the installation decision generator may decide not to generate the program installation decision to prevent that the portion of the environment that is to be illuminated does not receive enough light. If the operational information of the neighboring lighting module indicates, for example, that the neighboring lighting module is able to increase and/or decrease the level of light emission, the installation decision generator may decide to generate the program installation decision because, even if the light source of the particular lighting module is switched off or controlled to a fixed illumination level during the process of installing the program, the neighboring lighting module may be capable to compensate for a loss of emitted light or for too large an amount of emitted light.

Thus, the lighting system comprises features and characteristics which prevent that the provided functionality of the lighting system is too low at moments in time when new software must be installed on the lighting modules of the lighting system.

The program installation decision relates to the particular lighting module. The installation decision generator requires operational information of the neighboring lighting module. This is the minimum amount of information on which the decision will be based, but more information may be used by the installation decision generator. Such additional information is, for example, the daylight that is received at the particular moment, or information relating to the presence of people, etc.

Sufficiently close to a desired illumination of the portion of the environment that is to be illuminated does not directly mean that the illumination of the portion of the environment is exactly equal to the desired illumination, but the illumination, which will be provided during the software update, is within a range around the desired illumination and the range defines a minimum and maximum deviation from the desired illumination. The range may be a predetermined range, either expressed in absolute values or relative characteristics. In another embodiment, the illumination is sufficiently close to a desired illumination when a minimum illumination is to be provided. For example, in a car tunnel, there must be a minimum illumination level of each portion of the road and the illumination (during the process of updating the particular lighting module) is sufficiently close to the desired illumination when it is higher than the minimum illumination level.

In the above, the term "desired illumination" is used to indicate an intensity level of light which impinges on the portion of the environment to be illuminated and/or a particular color distribution of the light which impinges on the portion of the environment to be illuminated.

The portion of the environment is at least illuminated by the particular lighting module and also receives light from the neighboring lighting module. This does not exclude that the neighboring lighting module also illuminates areas outside the portion of the environment, and even the particular lighting module may possibly emit light towards other areas. Within the context of the invention it is only important that the portion of the environment to be illuminated receives light from the particular and the neighboring lighting module and that there is a desired illumination for the portion of the environment to be illuminated.

A lighting module may be integrated into a single luminaire, and, in other embodiments, one or more lighting modules may be integrated into a single luminaire. The lighting system according to the invention preferably comprises a plurality of luminaires.

The lighting modules have a network interface for communicating with other devices and/or lighting modules of the lighting system. Inside the lighting module, the network interface is accessible by other modules of the lighting modules. For example, the programmable controller is configured to communicate via the network interface. Or, for example, when the installation decision generator is arranged in a lighting module, the installation decision generator might also communicate via the network interface with other devices and/or lighting modules of the lighting system.

The program which is received by the particular lighting module and which must be installed on the programmable controller may be a new program for the programmable controller or an update/upgrade of an already installed program on the programmable controller.

Optionally, the lighting system comprises a network for connection to the network interfaces of the lighting modules. The network may be a wired network or a wireless network. The wired network may comprise dedicated wires which form the network infrastructure, but the wired network may also use power-line sharing, which means that signals to be transmitted are transmitted via the power lines to which the lighting modules are connected. The wireless network may be based on known wireless transmission protocols, such as WiFi, ZigBee, Bluetooth, etc. The wireless network may also be based on a dedicated protocol designed for the lighting system.

Optionally, the installation decision generator is configured to store and/or obtain knowledge about which lighting module is the neighboring lighting module of the particular lighting module. The installation decision generator may have stored a list of devices which are considered to be the neighboring device of the particular device. Such a list may be predefined at the moment when the lighting system was installed. In another embodiment, lighting modules of the lighting system are context aware and are able to find direct neighboring lighting modules e.g. by means of neighbor discovery protocols. It is to be noted that "neighbor" relates in this context to devices which are physically close and the only real important limitation to the term "neighbor" is that the "neighbor" and the particular device both (directly or indirectly) emit light towards the portion of the environment that is to be illuminated. In a lighting system, a neighbor discovery protocol may be based on a wireless network neighbor discovery protocol in which signal strengths of emitted RF signals determine which devices are possible neighbors. In the lighting system, a neighbor discovery protocol may also be based on emitted coded light signals and detecting such signals—the fact that a signal can be detected by the particular lighting module implies that the emitter of the coded light signal is in the neighborhood of the particular lighting module and the light intensity of the coded light signal may be used to detect a possible distance to the emitter of the coded light signal.

Optionally, the lighting system comprises a command generator for generating a light emission adaptation command for the neighboring lighting module. The generated light emission adaptation command indicates a desired change of the light emission of the neighboring lighting module to compensate for the light emission level of the particular lighting module during the installation of the program, to enable the illumination of the portion of the environment to be sufficiently close to the desired illumination of the portion of the environment. Thus, the generated light emission command is generated in such a way that the portion of the environment is illuminated sufficiently in accordance with the desired illumination. Thus, when the installation decision generator generates a program installation decision on the basis of operational information which indicates that the illumination of the portion of the environment may be compensated during the installation of the program, the command generator generates the command for controlling the neighboring lighting module such that the lack of functionality of the particular lighting module is actually compensated.

The lighting system may comprise more than one neighboring lighting module which together with the particular lighting module illuminates the portion of the environment. In such a situation the command generator may be configured to generate the light emission adaptation command for all neighboring lighting modules.

As will be discussed in the following of this document, the installation decision generator and the command generator may be arranged in different modules/devices of the lighting system, or in the same module or device of the lighting system, and in a particular embodiment, they may even be combined in a single piece of hardware.

Optionally, the installation decision generator and the command generator are coupled to each other and the installation decision generator and the command generator are configured to share the operational information and to cooperate in generating the program installation decision and in generating the adaptation command, to enable the illumination of the portion of the environment to be sufficiently close to the desired illumination of the portion of the environment during the period of time that the program is being installed. It is to be noted that the coupling may take place via the network, which might be the case when the installation decision generator and the command generator are arranged in different lighting modules or different devices of the lighting system.

Optionally, the particular lighting module comprises the installation decision generator.

Optionally, the neighboring lighting module also comprises an instance of the installation decision generator. Each installation decision generator generates the program installation decision to start the installation of the program on the respective programmable controller of the respective lighting module in which the respective installation decision generator is installed. Thus, according to this optional embodiment, the installation decision generator that is provided in the particular lighting module decides whether the particular lighting module starts the installation of the program, and the other instance of the installation decision generator provided in the neighboring lighting module decides whether the neighboring lighting module starts the installation of the program. According to this optional embodiment, the two installation decision generators may operate independently, however, as will be discussed hereinafter, they may alternatively operate in synchrony with each other.

Optionally, the respective installation decision generators of the particular lighting module and of the neighboring lighting module are configured to communicate with each other via their respective network interfaces. The installation decision generator of the neighboring lighting module is configured to receive a decision message when the installation decision generator of the particular lighting module generates the program installation decision. The installation decision generator of the neighboring lighting module is configured to postpone, when the decision message is received, the generation of its respective program installation decisions until a later moment in time. The later moment in time may be a randomly chosen moment in time, or a moment in time that is a predefined time interval after the moment of reception of the decision message. The later moment in time is, in an embodiment, at least far enough in the future to enable installation of the program at the particular lighting module to be executed during the period of time in between the reception of the decision message and the later moment in time. This embodiment prevents that the two lighting modules which illuminate the portion of the environment start installing the program at the same moment in time. Consequently, this embodiment prevents that the portion of the environment is not sufficiently illuminated.

It is to be noted that when the lighting system comprises more than two lighting modules and each lighting module comprises an instance of the installation decision generator, a plurality of installation decision generators may generate and receive the decision messages. The plurality of installation decision generators may each independently generate a later moment in time and, in an optional embodiment, each one of them generates a different moment in time.

Optionally, the respective installation decision generators of the particular lighting module and the neighboring lighting module are configured to communicate with each other via the network. The installation decision generator of the particular lighting module is configured to receive a decision message when the installation decision generator of the neighboring lighting module generates the program installation decision. The installation decision generator of the particular lighting module is configured to postpone, when the decision message is received, the generation of its respective program installation decisions until a later moment in time.

Optionally, the lighting system comprises a central unit and the central unit comprises a network interface for allowing the central unit to communicate with lighting modules and devices of the lighting system via the network. The central unit comprises the installation decision generator. The central unit is configured to communicate the generated program installation decision via its respective network interface (via the network) to the particular lighting module. Thus, in accordance with this optional embodiment, the controlling of the lighting modules is not distributed among the lighting modules themselves, but may be present in the central unit. In such a situation it is logical that the installation decision generator is arranged in the central unit. It is to be noted that one lighting module may be combined with the central unit and, in another embodiment, the central unit is a separate device without lighting capabilities. The central unit may be preprogrammed comprising knowledge about the topology of the lighting system, which means that the central unit has knowledge about which lighting modules of the lighting system are a neighboring lighting module of the particular lighting module. In this optional embodiment, the installation decision generator may obtain this information from the central unit. The central unit may also have operational information about the neighboring lighting module because the central unit may control the illumination level of the lighting modules of the lighting system. In this optional embodiment, the installation decision generator may obtain the operational information from the central unit.

Optionally, the particular lighting module comprises the command generator and the particular lighting module is configured to communicate the generated light emission adaptation command via its respective network interface (via the network) to the neighboring lighting module.

Optionally, the neighboring lighting module comprises the command generator.

Optionally, when the lighting system comprises a central unit, the central unit comprises the command generator and the central unit is configured to communicate the generated light emission adaptation command via its respective network interface (via the network) to the neighboring lighting module.

Optionally, the operational information comprises information which relates to a capability of the neighboring lighting module to change the amount of light emitted by its respective light source compared to the actual light emission by the light source at the moment in time that the operational information is obtained. The installation decision generator only generates the program installation decision when the operational information indicates that the neighboring lighting module is able to compensate the light emission of the particular lighting module during the installation of the program by the particular lighting module. It is to be noted that the changing of the amount of emitted light may be that the neighboring lighting module is able to reduce the amount of emitted light and/or that the neighboring lighting module is able to increase the amount of emitted light. The operational information may also indicate how much the amount of emitted light may (maximally) be increased or decreased. The operational information may also relate to capabilities of emitted specific color distributions and which specific color distribution is emitted at the moment of time when the operational information is obtained. Alternatively, or in addition, the operational information may indicate whether the neighboring lighting module is installing updated software or whether the neighboring lighting module is in normal operation.

Optionally, the command generator is configured to obtain or store knowledge about a light emission of the particular light module during the installation of the program on the particular light module. The command generator is configured to obtain or store information about the desired illumination of the portion of the environment, and the command generator is configured to calculate how much the illumination of the portion of the environment deviates from the desired illumination of the portion of the environment when the particular lighting module installs the program. The calculated deviation is used to generate the indicated desired change of the light emission adaptation command. "Knowledge about a light emission of the particular light module during the installation of the program on the particular light module" is, for example, whether the particular lighting module switches its light source completely off during the installation of the program, or at which particular light emission level the light source remains during this installation process. In the above, the terms "obtain or store knowledge" are used. This means that the particular unit has this information stored in its internal memory (or it is hardcoded in its hardware) or the particular unit is capable of requesting and receiving the particular knowledge from other devices in the lighting system. Other devices are, for example, a central unit in the lighting system, or a specific lighting module of the lighting system.

Optionally, the lighting system comprises a desired illumination determinator for determining the desired illumination of the portion of the environment. Here at least one of the particular lighting module and the neighboring lighting module comprises an occupancy sensor for sensing whether people are present in an area illuminated by the light source of the at least one of the particular lighting module and the neighboring lighting module. The desired illumination determinator is configured to adapt the desired illumination of the portion of the environment in dependence on information sensed by the occupancy sensor. Thus, the lighting system shows dynamic behavior in dependence on the presence of people in the area that is observed by the occupancy sensor. In this optional embodiment, the desired illumination of the portion of the environment is adapted when suddenly people are present, or when after some time no people are present anymore. Because the installation decision generator and also the command generator take into account the desired illumination condition, the lighting system of this optional embodiment is capable to deliver dynamic behavior in dependence on the presence of people, even when the software of the particular lighting module must be updated.

Optionally, the desired illumination determinator is configured to provide the desired illumination of the portion of the environment to the installation decision generator. When the lighting system comprises also a command generator, the desired illumination determinator is configured to provide the desired illumination of the portion of the environment to the installation decision generator and the command generator. It is to be noted that the desired illumination determinator, the command generator and the installation decision generator may be arranged in different devices and, thus, in a particular embodiment, the determined desired illumination may be communicated via the network to the respective devices and/or units.

Optionally, the particular lighting module comprises the desired illumination determinator.

Optionally, the neighboring lighting module comprises the desired illumination determinator.

Optionally, when the lighting system comprises a central unit, the central unit comprises the desired illumination determinator.

According to another aspect of the invention, a method of starting an installation of a program on a programmable controller of a particular lighting module of a lighting system is provided. The particular lighting module has a neighboring lighting module within the lighting system. The neighboring lighting module is arranged to illuminate together with the particular lighting module a portion of an environment. The method comprises the stages of: i) obtaining operational information relating to a light emission operation of the neighboring lighting module, ii) generating a program installation decision to start the installation of the program on the programmable controller of the particular lighting module, wherein the generation of the program installation decision is based on information, comprising the obtained operational information, to enable illumination of the portion of the environment to be sufficiently close to the desired illumination of the portion of the environment during the period of time that the program is being installed, and iii) starting the installation of the program on the programmable controller of the particular lighting module when the program installation decision has been generated.

Optionally, the method comprises the stage of obtaining information about which lighting module is the neighboring lighting module for the particular lighting module.

According to a further aspect of the invention, a computer program is provided which comprises instructions for causing a processor system to perform the above discussed method. The computer program may be stored on a suitable storage medium, such as a hard disk, a floppy, a memory etc. The computer program may be sent as a signal along a wire, or wireless, or using a data network, e.g., the Internet. The computer program may be made available for download and/or for remote usage on a server.

The method and the computer program according to the aspects of the invention provide the same benefits as the lighting system according to the first aspect of the invention and have similar embodiments with similar effects as the corresponding embodiments of the system.

These and other aspects of the invention are apparent from and will be elucidated with reference to the embodiments described hereinafter.

It will be appreciated by those skilled in the art that two or more of the above-mentioned options, implementations, and/or aspects of the invention may be combined in any way deemed useful.

Modifications and variations of the system, the method, and/or of the computer program, which correspond to the described modifications and variations of the system, can be carried out by a person skilled in the art on the basis of the present description.

It should be noted that items denoted by the same reference numerals in different Figures have the same structural features and the same functions, or are the same signals. Where the function and/or structure of such an item have been explained, there is no necessity for repeated explanation thereof in the detailed description.

The Figures are purely diagrammatic and not drawn to scale. Particularly for clarity, some dimensions are exaggerated strongly.

DETAILED DESCRIPTION

Figure 1:
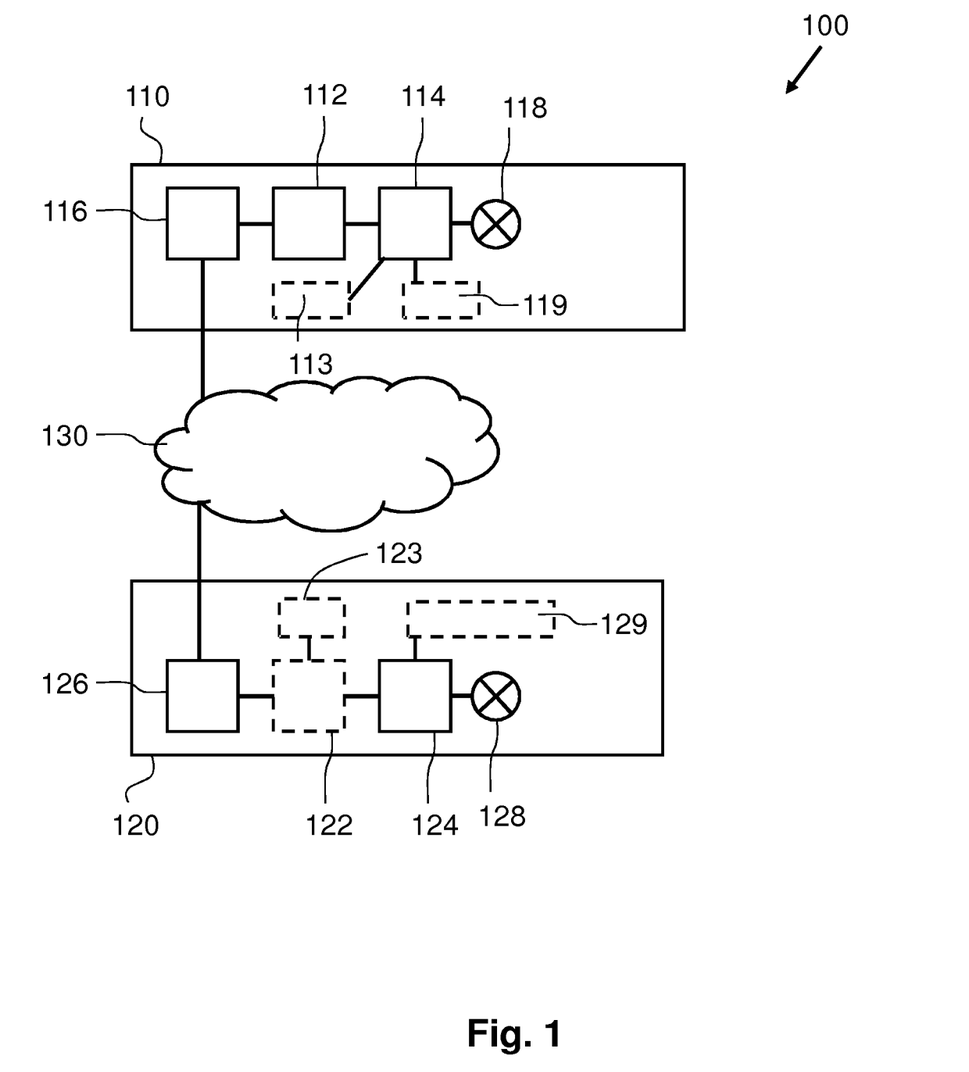
FIG. 1 schematically shows an embodiment of a lighting system according to the first aspect of the invention, FIG. 2 schematically shows a tunnel which is illuminated by a lighting system according to an embodiment of the invention, FIG. 3 schematically shows another embodiment of a lighting system according to the first aspect of the invention, FIG. 4 schematically shows an illumination pattern chart of an embodiment of a lighting system, FIG. 5 schematically shows an illumination pattern chart in a situation where one of the lighting modules is installing a program and other lighting modules do not adapt their illumination level, FIG. 6 schematically shows an illumination pattern chart of the lighting system according to an embodiment of the invention where the installation of a program takes into account capabilities of neighboring lighting modules and where neighboring lighting modules do adapt their illumination level, and FIG. 7 schematically shows a method of starting an upgrade of a program on a programmable controller of a particular lighting module of a lighting system.

A first embodiment is shown in FIG. 1. FIG. 1 schematically shows an embodiment of a lighting system 100 according to the first aspect of the invention. The lighting system 100 may be used to illuminate an environment. The environment may be an indoor space or an outdoor space. The indoor space may be a room in a house, in an office, or, for example, a corridor of a building. The indoor space may also be a road-tunnel. The outdoor space may, for example, be a road or a parking lot.

The lighting system 100 comprises a particular lighting module 110 and a neighboring lighting module 120 which are coupled to each other via a network 130. Both lighting modules 110, 120 comprise a light source 118, 128 for emitting light, a programmable controller 114, 124 for controlling an operation of the light source and a network interface 116, 126 for allowing the programmable controller to communicate via the network with other devices of the lighting system. The lighting modules 110, 120 may receive via the network 130 a program for their respective programmable controller 114, 124. The program is, for example, pushed, sent, by a server which is connected to the network 130, towards the lighting modules 110, 120. In another embodiment, the lighting modules 110, 120 are configured to check via the network 130 on a server whether there is updated software available, and if there is new updated software available, the lighting modules 110, 120 may download the updated software via the network 130. The lighting modules 110, 120 do not immediately install the updated software, but install the program in dependence on a program installation decision. In the following discussion of FIG. 1, lighting module 110 is indicated by the term "the particular lighting module 110" and lighting module 120 is indicated by the term "the neighboring lighting module 120". The particular lighting module 110 and the neighboring lighting module 120 are arranged at a particular location in the environment that, in use, is illuminated by the lighting system 100. Both the particular lighting module 110 and the neighboring lighting module 120 (partly) illuminate a portion of the environment. The portion of the environment receives light from the light source 118 of the particular lighting module 110 and from the light source 128 of the neighboring lighting module 120. It is not necessary that all light that is generated by the respective light source 118, 128 is emitted towards the portion of the environment. The only relevant criterion in the context of this invention is that the light which impinges on the portion of the environment originates from both light sources 118, 128 and when the amount of light emitted by one of the light sources 118, 128 changes, the amount of light which impinges on the portion of the environment changes as well. Furthermore, the light which is emitted by the respective light source 118, 128 and which impinges on the portion of the environment may be transmitted in a straight line from the light source 118, 128 towards the portion of the environment, but may also be subject to reflections (such as, for example, reflections by walls of a corridor when the particular lighting module and the neighboring lighting module are provided in the corridor of a building).

The particular lighting module 110 comprises an installation decision generator 112 for generating a program installation decision to start the installation of the program on the particular lighting module 110. In an embodiment, the installation decision generator 112 stores knowledge about which lighting module is the neighboring lighting module 120 of the particular lighting module 110. Alternatively, this knowledge may also be obtained at the moment that this knowledge is used in the installation decision generator 112. Obtaining the knowledge may be done by requesting the information from other devices which are coupled to the network, or specific neighbor discovery protocols are executed to find the neighboring lighting module 120. The installation decision generator 112 also obtains operational information which relates to the light emission operation of the neighboring lighting module 120. The operational information comprises, for example, information about the light emission level and/or the color of the light currently being emitted by the neighboring lighting module 120, and, for example, about the extent to which the neighboring lighting module 120 is capable of changing its light emission (lower/ higher light intensities, other colors, etc.). The installation decision generator 112 bases the program installation decision on the obtained operational information so as to enable illumination of the portion of the environment to be sufficiently close to a desired illumination during the installation of the program. In other words, the illumination that is desired to be available is known, for example a minimum illumination level, and the installation decision generator 112 knows what will happen with the light emission of the light source 118 of the particular lighting module 110 and also knows the neighboring lighting module's 120 capabilities to change or adapts its light emission, and therefore the installation decision generator 112 is capable of estimating whether taking the program installation decision would lead to insufficient illumination of the portion of the environment. If this is the case, the installation decision generator 112 decides not to start the installation of the program on the particular lighting module 110. If the installation decision generator 112 knows, however, that the illumination of the portion of the environment will not be insufficient (because, for example, the neighboring lighting module 120 is capable to compensate for the loss of illumination of the portion of the environment when the light source 118 is switched off during the installation of the program on the particular lighting module 110), the program installation decision is generated.

It is to be noted that in the above discussion it has been mentioned that the installation decision generator 112 is capable of estimating whether starting the installation of the program would lead to insufficient illumination of the portion of the environment. The information available to estimate this is the knowledge which lighting modules emit light together with the particular lighting module 110 towards the portion of the environment, on the basis of operational information of at least one neighboring lighting module and on the basis of knowledge about the behavior of the particular lighting module 110 during the time interval that the particular lighting module 110 installs the update program. The estimation may be based on applying some relatively simple rules that are pre-programmed in the installation decision generator 112—such rules were, for example, deducted at the moment in time that the lighting system was installed and they describe in a relatively simple way what happens with the illumination of the portion of the environment when the particular lighting module 110 and/or the neighboring lighting module 120 change the light emission of their respective light source 118, 128. Alternatively, the installation decision generator 112 comprises a sort of optical simulator which applies well-known optical formulas which describe how much light impinges on the portion of the environment in dependence on the available information. The invention is not limited to a particular way of estimating the illumination of the portion of the environment, and other techniques known by the skilled person to estimate the illumination of the portion of the environment in dependence on available information may be used as well.

In an embodiment, the neighboring lighting module 120 comprises a command generator 122 for generating a light emission adaptation command for the neighboring lighting module 120. The generated adaptation command indicates a desired change of the light emission of the neighboring lighting module 120 to compensate for the light emission level of the particular lighting module 110 during the installation of the program on the particular lighting module such that an illumination of the portion of the environment can be obtained that is sufficiently close to a desired illumination of the portion of the environment during the installation of the program. Thus, both the installation decision generator and the command generator contribute to achieve that the portion of the environment will not become insufficiently illuminated. It is to be noted that insufficient means that the illumination is not close enough to a desired light illumination and, thus, it might also mean that insufficient illumination means that the illumination is too bright or too low.

In an embodiment, the installation decision generator 112 and the command generator 122 are coupled to each other. In the embodiment of FIG. 1 they are capable to communicate with each other via the network 130. The installation decision generator 112 and the command generator 122 share the operational information and cooperate in the generation of the program installation decision and the generation of the light emission adaptation command to obtain sufficient illumination of the portion of the environment. By coordinating the moment in time that the installation of the update program on the particular lighting module 110 starts and the controlling of the light emission of the light source 128 of the neighboring lighting module 120, the best illumination of the portion of the environment may be obtained during the period of time that the program is being installed on the particular lighting module 110.

In an embodiment, the neighboring lighting module 120 also comprises an instance of the installation decision generator 123. The installation decision generator 123 has the same characteristics as the installation decision generator 112 of the particular lighting module 110, with this difference that the installation decision generator 123 generates the program installation decision generator for starting the installation of the program on the neighboring lighting module 120 instead of on the particular lighting module 110. The installation decision generators 112, 123 are capable of communicating with each other via the network 130. When a first one of the installation decision generators 112, 123 generates the program installation decision, the other one of the installation decision generators 112, 123 receives a decision message from the first one of the installation decision generators 112, 123. The decision message indicates that a program installation decision is being generated and that the lighting module from which the decision message originates starts the installation of the program. When one of the installation decision generators 112, 123 receives a decision message, it postpones the generation of its own program installation decision until a later moment in time. The later moment in time may be determined on the basis of a randomly generated moment in time, or may be based on adding a predetermined period of time to the moment in time that the decision message was received. In an embodiment, the later moment in time is, preferably, far enough in the future that the lighting module, on which the installation of the program has been started, is capable of finishing the installation of the program before said later moment in time.

The particular lighting module 110 and/or the neighboring lighting module 120 may comprise an occupancy sensor 119, 129 which senses whether a person is present in or close to the portion of the environment. The information of the occupancy sensors 119, 129 may be shared by the respective lighting modules 110, 120. In an example, the particular lighting module 110 comprises a desired illumination determinator 113. The desired illumination determinator 113 determines the desired illumination of the portion of the environment and the desired illumination is adapted in dependence on information sensed by at least one of the occupancy sensors 119, 129. For example, when people are present in or close to the portion of the environment, a desired illumination level is increased, or a desired color of the illumination of the portion is changed. The desired illumination determinator 113 shares the generated desired illumination with the installation decision generator(s) 112, 123 and/or with the command generator 122.

It is to be noted that the different sub-systems of the particular lighting module 110 and the neighboring lighting module 120 are connected with each other in a specific chain of sub-systems. The drawn connections are purely exemplary connections and in specific implementations other connections between sub-systems may be provided and sub-systems which are in between two other sub-systems may transmit data between the two other sub-systems.

It is to be noted that the lighting system 100 does not have a central entity which controls each lighting module 110, 120. In the lighting system 100, each lighting module 110, 120 is independent up to a certain level and runs algorithms on its programmable controller 114, 124 and on other sub-systems of the lighting module 110, 120 to control the light source 118, 128. Thus, the control of the illumination of the environment is distributed among the different lighting modules 110, 120. Therefore, each lighting module 110, 120 is able to communicate with at least neighboring lighting modules such that the desired illumination of the portions of the environment can be guaranteed. In an embodiment, the lighting modules 110, 120 share status information and information about capabilities to change their status. The status may be the actual light emission of the light source 118, 128, or it may be the operational status, such as "currently installing the program", or "currently in normal operation". The capability to change their status may comprise information about "the installation will be ended at a particular moment in time", or "the light intensity level may be adapted to a level within the interval from 0% to 100% intensity", etc.

In various practical embodiments, all lighting modules 110, 120 comprise an instance of an installation decision generator, an instance of a command generator, an occupancy sensor and an instance of the desired illumination determinator. Although these units are discussed separately from the programmable controllers 114, 124 of the lighting units 110, 120, the units may be combined with the programmable controllers 114, 124. For example, the programmable controllers 114, 124 may run a computer program code which comprises instructions to execute the function of at least one of the installation decision generator, the command generator, and the desired illumination determinator.

Figure 2:
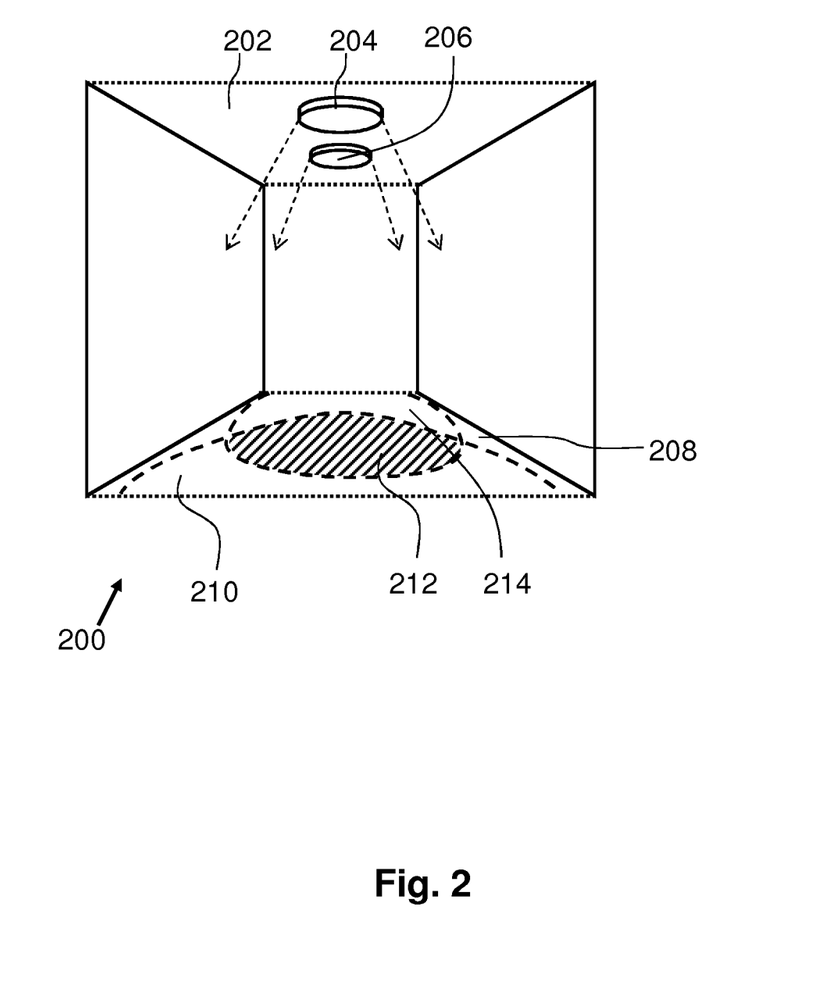

FIG. 2 schematically shows in a three-dimensional view, a tunnel 200 which is illuminated by a lighting system according to the invention. The tunnel 200 is, for example, a road tunnel which requires a minimum illumination of the road such that cars can safely drive through the road tunnel. Alternatively, the same picture may be used to present the use of the lighting system, in, for example, a corridor of a building. The corridor is for example a corridor of a hotel at which the rooms of the hotels are located and the corridor must be illuminated according to a desired illumination level, and, more in particular, must have a high enough illumination level when people are present in the corridor. In the discussion of the figure, the term "tunnel 200" is used and instead of "tunnel", the term "corridor" may be read as well. At the ceiling 202 of the tunnel 200, luminaires 204, 206 are provided which each comprise a lighting module of the lighting system according to the invention. For example, the lighting modules are lighting modules of the lighting system 100 of FIG. 1, or of the lighting system 300 of FIG. 3. A first luminaire 204 comprises the particular lighting module and the second luminaire 206 comprises the neighboring lighting module. The lighting system illuminates a road 208 of the tunnel 200. The particular lighting module illuminates a part 210 of the road 208 and the neighboring lighting module illuminates another part 214 of the road 208. The intersection 212 of both parts 210, 214 is the portion of the environment which is illuminated by both the particular lighting module and the neighboring lighting module. It is to be noted that in practical embodiments, the illuminated parts 210, 214 of the road 208 cannot be exactly indicated by drawing a line, because towards the border of the parts 210, 214, the illumination level slowly decreases. In other words, the borders of the parts 210, 214 are formed by a soft transition from full illumination to no illumination. Therefore, the border of portion of the environment will also exhibit a soft-transition area.

Figure 3:
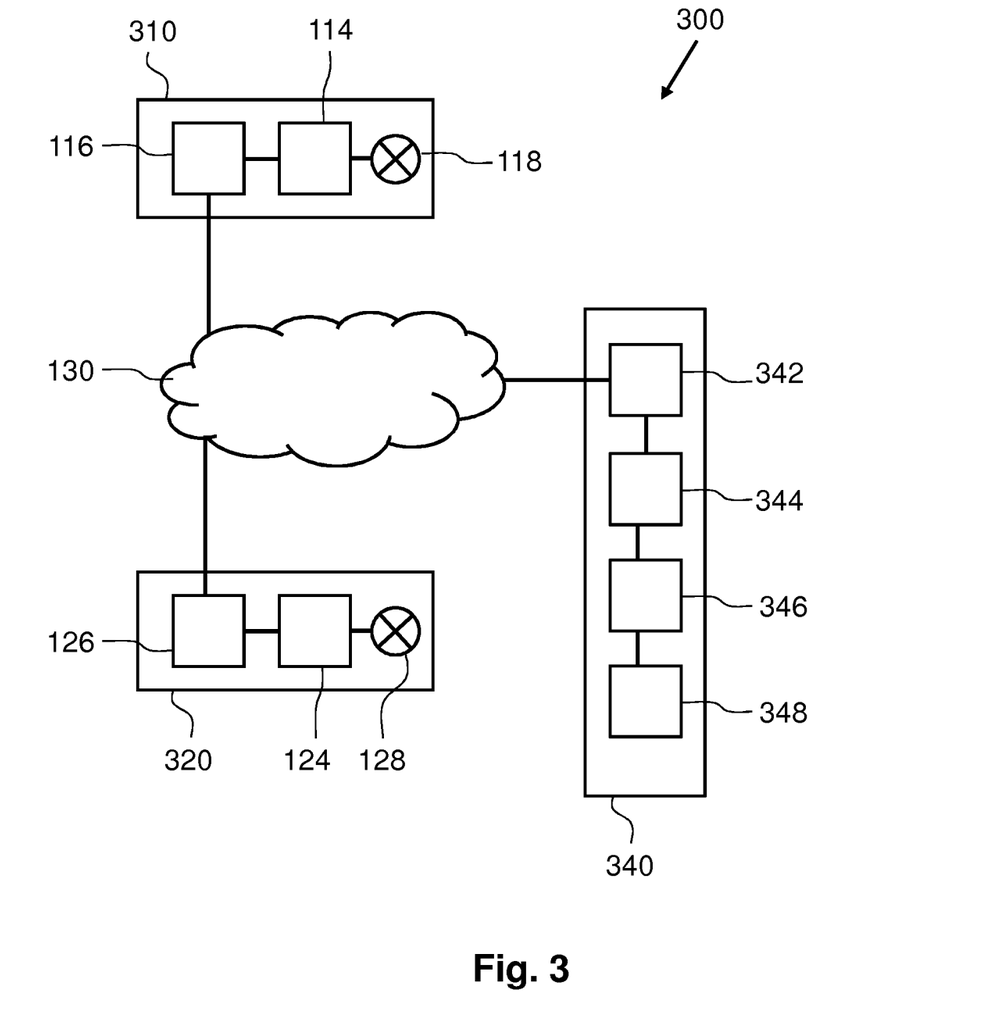

FIG. 3 schematically shows another embodiment of a lighting system 300 according to the first aspect of the invention. The lighting system 300 is similar to the lighting system 100 of FIG. 1. However, the lighting system 300 has a central unit 340 which controls the lighting system 300. The lighting modules 310, 320 comprise a network interface 116, 126, a programmable controller 114, 124 and a light source 118, 128. Optionally, one or both lighting modules 310, 320 comprise an occupancy sensor (not shown). Details of these elements of the lighting modules 310, 320 were discussed previously in the context of FIG. 1. Other modules of the lighting system 100, which were provided in the lighting modules 110, 120, are in the lighting system 300 provided in the central unit 340. The central unit 340 at least comprises a network interface 342, which allows the central unit 340 to communicate with the lighting modules 310, 320 of the lighting system 300. Further units which may be provided in the central unit 340 are: the installation decision generator 344, the command generator 346 and, for example, the desired illumination determinator 348.

Because a central unit 340 is provided in the lighting system 300, the lighting system 300 is centrally controlled and all knowledge about the topology of the lighting system (i.e. which lighting modules are located where and illuminate the same portions of the environment to be illuminated), knowledge about the capabilities of the lighting modules (dimmable, etc.), knowledge about the current light emission of the lighting modules, etc. might be present in the central unit 340 itself. The information relating to the topology and the capabilities of the lighting modules may be programmed into the central unit. A suitable moment to program this information in the central unit 340 is the moment in time when the lighting system is installed or when the central unit 340 is configured to operate in the lighting system 300.

The central unit 340 may also be the unit which provides/communicates the program to the respective lighting modules 310, 320. In another embodiment, the lighting modules 310, 320 obtain the program from a server which they can reach via the network 130. For example, the network 130 is coupled via a router or a gateway to the internet where, for example, the programs are published by the manufacturer of lighting modules 310, 320.

The lighting system 300 of FIG. 3 is centrally controlled. The lighting system 100 of FIG. 1 uses distributed control to control the light emission by the respective lighting modules 110, 120. It is to be noted that the invention is not limited to any one of these specific extremes and that the skilled person can also come up with embodiments falling within the scope of the invention, in which part of the control is performed locally and part of the control is performed centrally.

Figure 4:
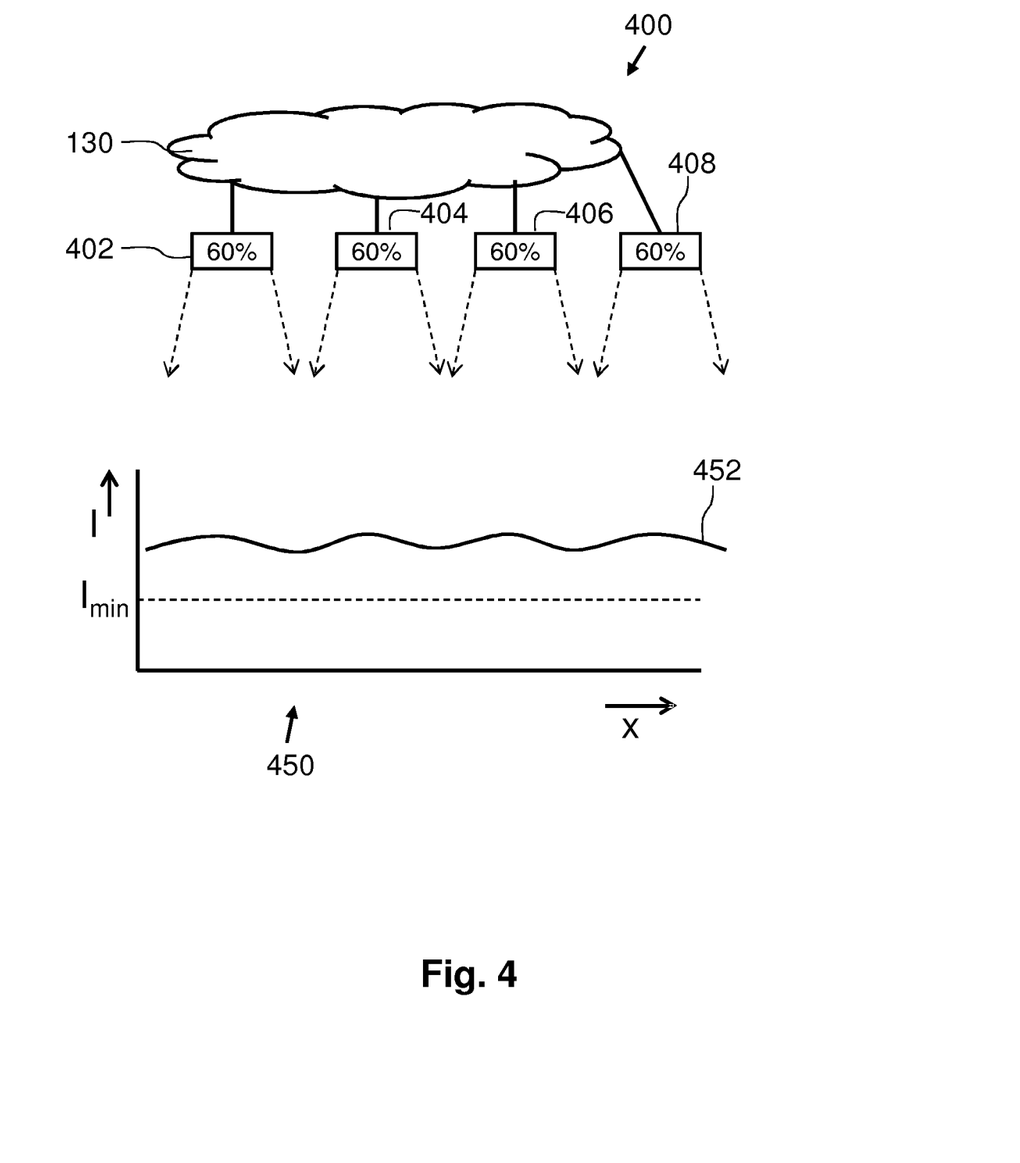

FIG. 4 schematically shows an illumination pattern chart 450 of an embodiment of a lighting system 400. The presented lighting system 400 has four lighting modules 402 . . . 408 in a row. This row, symbolically, represents the x-axis (as indicated at the bottom of the illumination pattern chart 450). The presented illumination modules 402 . . . 408 are coupled to a network 130 and they have the same characteristics as the lighting modules 110, 130 of FIG. 1. Alternatively, the presented illumination modules 402 . . . 408 have the same characteristics as the lighting modules 310, 330 of FIG. 3 if it is assumed that the lighting system 400 also comprises a central unit (now shown) such as discussed in the context of FIG. 3. In this example, in normal operation, that is when the lighting modules are not installing the program for their programmable controller, each one of the lighting modules 402 . . . 408 emits at 60% of its maximum light emission capability. This means that the light emission of the lighting modules may, when required, increase by 40% or decrease by 60%. The lighting modules 402 . . . 408 emit most of their light in a downward direction and the footprints of the light beams emitted by the lighting modules 402 . . . 408 partially overlap. This overlap may extend towards or beyond a position exactly below one or more subsequent lighting modules in the row. If it is assumed that the lighting modules 402 . . . 408 are provided on a ceiling of a particular space and emit light towards a floor which is opposite the ceiling, it is possible to measure at the floor, along a line which is exactly beneath the row of lighting modules 402 . . . 408, a light intensity I that impinges on the floor at the positions along the line. The measured light intensity I is shown by line 452 in the illumination pattern chart 450. Below each lighting module 402 . . . 408, the lighting intensity is higher than in between two lighting modules 402 . . . 408. In the illumination pattern chart 450, a (minimum) desired illumination intensity $I_{min}$ is indicated. Hereinabove, it has been discussed that the illumination pattern chart is measured. However, such an illumination pattern chart may also be simulated, calculated and/or estimated on the basis of available knowledge about the topology of the lighting system and operational information of the lighting modules. For example, the installation decision generator and/or the command generator simulates, calculates or estimates an illumination pattern chart to determine whether the illumination of the portion of the environment is sufficiently close to the desired illumination.

Figure 5:
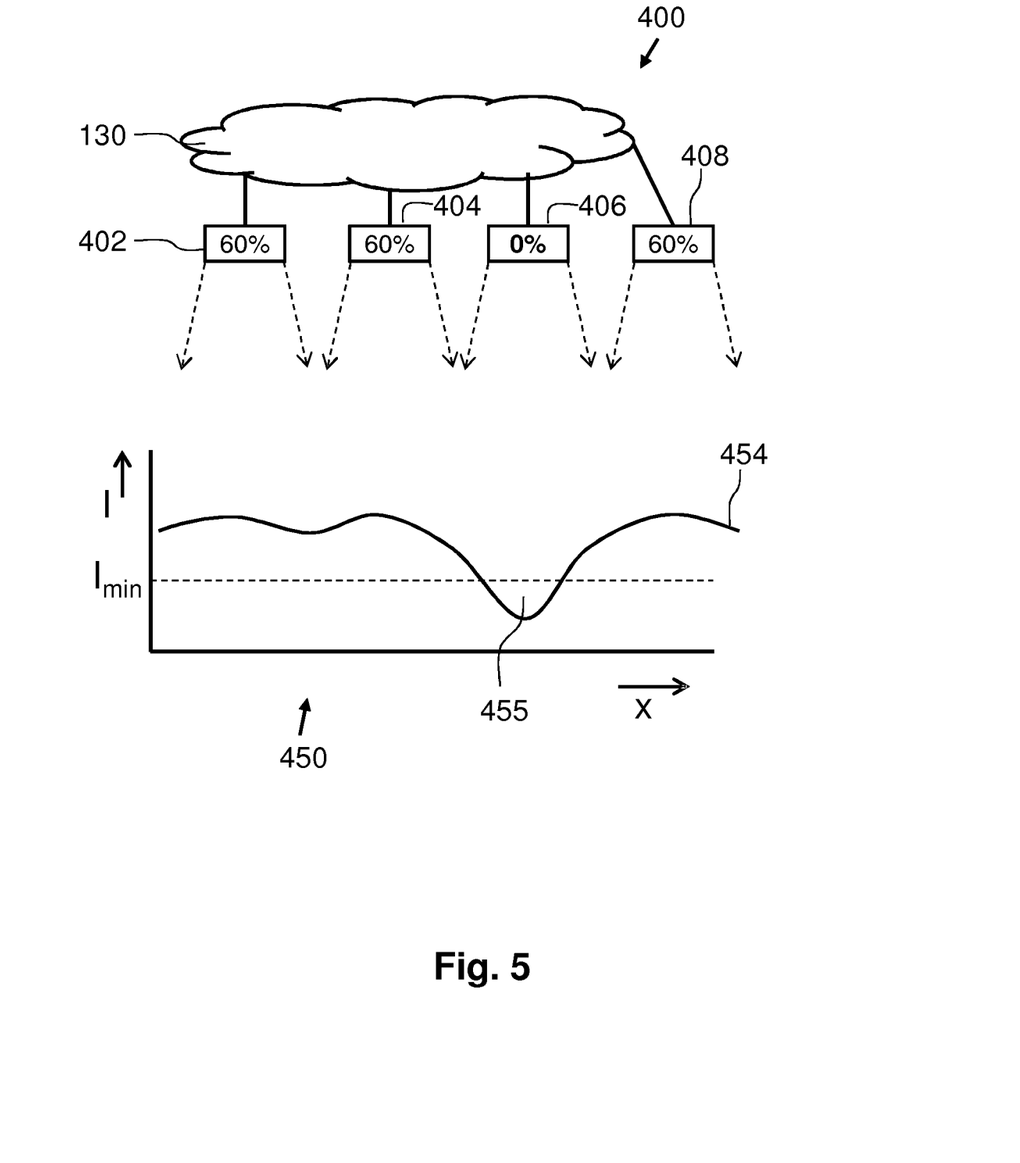

FIG. 5 schematically shows an illumination pattern chart 450 of the lighting system 400 in a situation where one lighting module 406 is installing the program and other lighting modules 402, 404, 408 do not adapt their light emission level. It is to be noted that the information presented in FIG. 5 relates to a situation where the decision to install the program was not based on characteristics of the invention of this application. In the presented example, when lighting module 406 is installing the program, lighting module 406 is not operational and switches off its light source. Thus, 0% of the maximum light intensity is emitted. The other lighting modules 402, 404, 408 remain emitting at 60% of their maximum intensity level. Thus, as shown by line 454 in the illumination pattern chart 450, the light intensity I that impinges on the floor is still above the desired illumination intensity $I_{min}$ below lighting modules 402, 404, 408, while, as indicated at position 455, the light intensity I that impinges on the floor is too low below lighting module 406. According to the invention, either the decision to start the installation of the program on the lighting module 406 would not have been taken, if it had been known that the other lighting modules 402, 404, 408 would not adapt the intensity of their light emission, or at least one of the neighboring lighting modules 404, 408 would have adapted the intensity of their light emission to compensate for the loss of light during the period that the lighting module 406 is installing the program. The latter situation is shown in FIG. 6.

Figure 6:
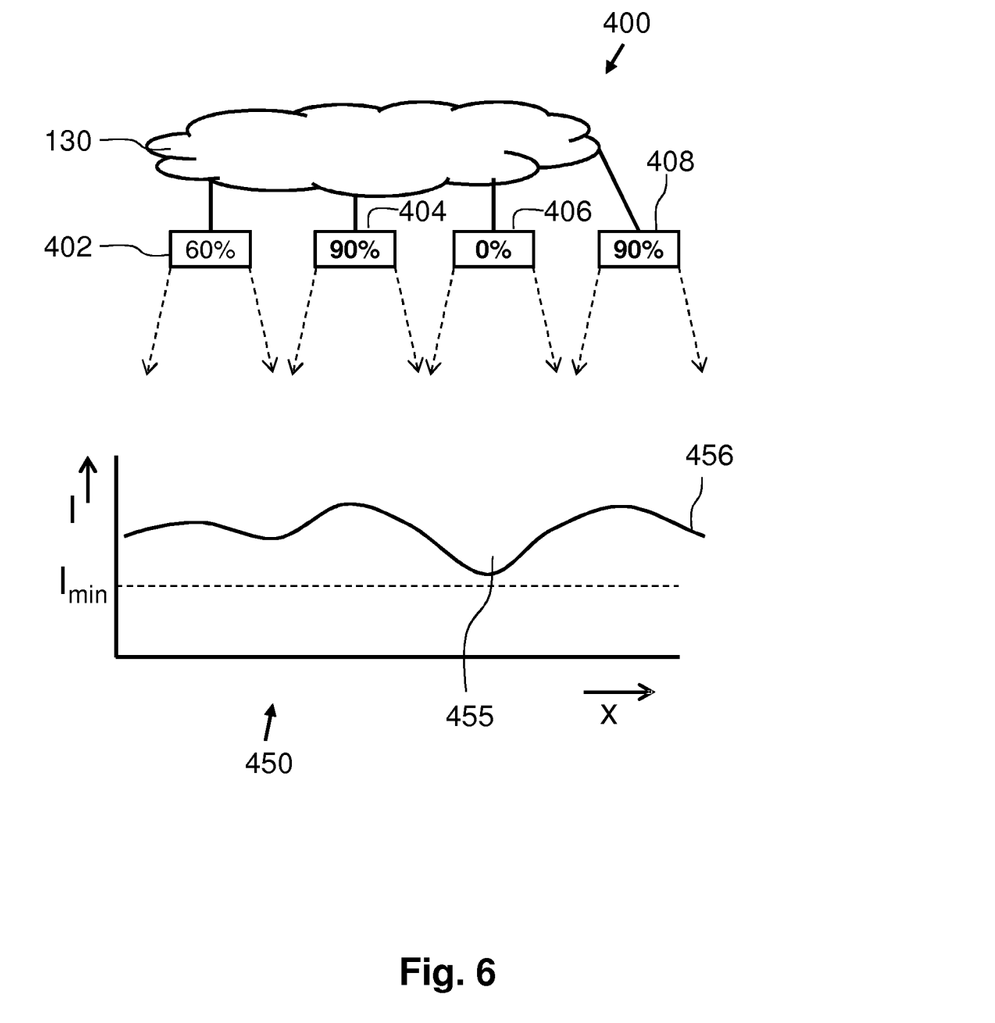

FIG. 6 schematically shows an illumination pattern chart 450 of the embodiment of the lighting system when the installing of the program takes into account the capabilities of neighboring lighting modules 404, 408 and when neighboring lighting modules 404, 408 do adapt their illumination level. In the lighting system 400 there is at least one installation decision generator and at least one command generator, and these two units cooperate in such a way that the illumination light intensity of the neighboring lighting modules 404, 408 increased to 90% of their maximum and it is shown in the illumination pattern chart 450, by means of line 456, that at position 455 (below the lighting module 406) the light intensity I at the floor is above the (minimum) desired illumination intensity $I_{min}$.

Figure 7:
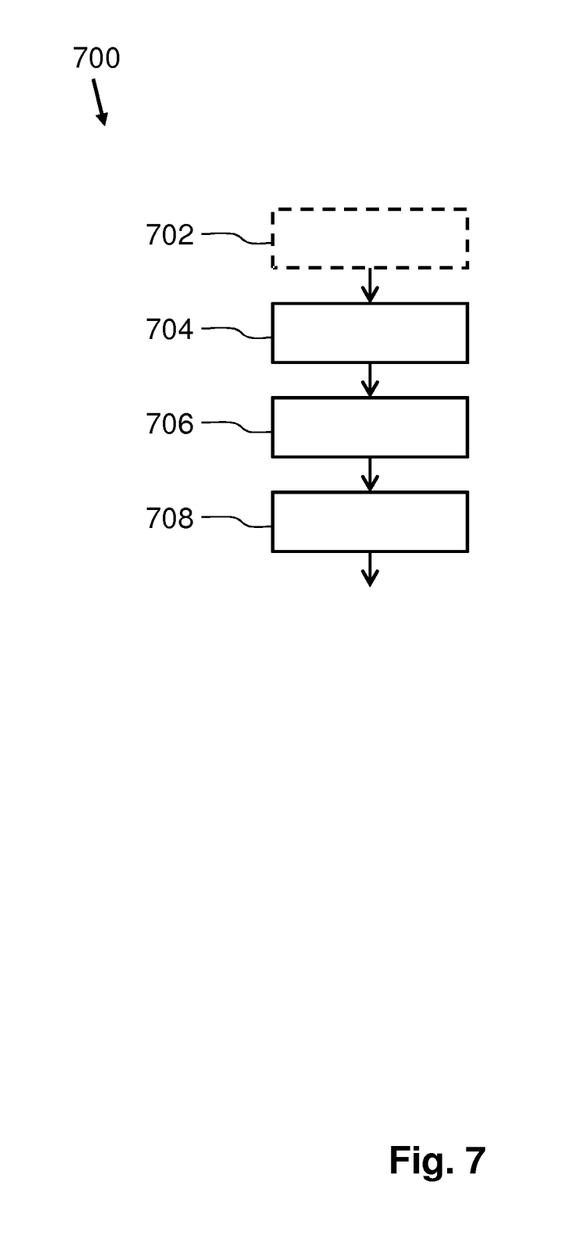

FIG. 7 schematically shows a method 700 of starting an upgrade of a program on a programmable controller of a particular lighting module of a lighting system. The particular lighting module has a neighboring lighting module within the lighting system which illuminates together with the particular lighting module a portion of an environment. The method 700 comprises the optional stage of obtaining 702 information about which lighting module is the neighboring lighting module for the particular lighting module, and the method 700 comprises the stages of i) obtaining 704 operational information relating to a light emission operation of the neighboring lighting module, ii) generating a program installation decision to start the installation of the program on the programmable controller of the particular lighting module, the generation of the program installation decision being based on information comprising the obtained operational information to enable illumination of the portion of the environment such that it is sufficiently close to the desired illumination of the portion of the environment during the period of time that the program is being installed, iii) starting 708 the installation of the program on the programmable controller of the particular lighting module when the program installation decision has been generated.

In summary, a lighting system for illuminating an environment and a method of starting an installation of a program on a programmable controller of a lighting module are provided. The lighting system comprises a particular lighting module, a neighboring lighting module and an installation decision generator. A portion of the environment is illuminated by both lighting modules. Both lighting modules have a programmable controller and may receive a program, via a network interface, which is to be installed on the programmable controller. The installation decision generator decides whether the installation of the program on the particular lighting module may start, based on operational information as to whether the light emission capabilities of the neighboring lighting module enable illumination of the portion of the environment to be sufficiently close to a desired illumination of the portion.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lighting system for illuminating an environment, the lighting system comprising:
   a plurality of lighting modules, each of the lighting modules comprising a light source for emitting light, a programmable controller for controlling an operation of the light source and a network interface for communicating with other lighting modules and devices of the lighting system via a network, each of the lighting modules being configured to receive a program for the respective programmable controller via the network interface and each of the lighting modules being configured to install the program on the respective programmable controller in dependence on a program installation decision, the plurality of lighting modules comprising a particular lighting module and at least one neighboring lighting module that is arranged to illuminate together with the particular lighting module a portion of the environment; and
   an installation decision generator for generating the program installation decision to start installation of the program on the programmable controller of the particular lighting module, the installation decision generator being configured to obtain operational information relating to a light emission operation of the neighboring lighting module, wherein the installation decision generator is configured to base the program installation decision on information, comprising the obtained operational information, to enable illumination of the portion of the environment to be within a pre-determined range or threshold of a desired illumination (Imin) of the portion of the environment during the period of time that the program is being installed.

2. The lighting system according to claim 1, wherein the lighting system comprises a command generator for generating a light emission adaptation command for the neighboring lighting module, wherein the generated light emission adaptation command indicates a desired change of the light emission of the neighboring lighting module to compensate for a light emission level of the particular lighting module during the installation of the program so as to enable the illumination of the portion of the environment to be within the pre-determined range or threshold of the desired illumination (Imin) of the portion of the environment during the period of time that the program is being installed.

3. The lighting system according to claim 2, wherein the installation decision generator and the command generator are coupled to each other and the installation decision generator and the command generator are configured to share the operational information and to cooperate in generating the program installation decision and in generating the adaptation command to enable the illumination of the portion of the environment to be within the pre-determined range or threshold of the desired illumination (Imin) of the portion of the environment during the period of time that the program is being installed.

4. The lighting system according to claim 2, wherein the particular lighting module comprises the command generator and the particular lighting module is configured to communicate the generated light emission adaptation command via the respective network interface of the particular lighting module to the neighboring lighting module.

5. The lighting system according to claim 2, wherein the command generator is configured to obtain or store data about a light emission of the particular lighting module during the installation of the program, the command generator is configured to obtain or store information about the desired illumination (Imin) of the portion of the environment, and the command generator is configured to calculate how much the illumination of the portion of the environment deviates from the desired illumination (Imin) of the portion of the environment when the particular lighting module is installing the program, wherein the calculated deviation is used to generate the indicated desired change of the light emission adaptation command.

6. The lighting system according to claim 2, wherein the lighting system comprises a central unit configured to communicate the generated program installation decision to the particular lighting module and wherein the central unit comprises the command generator and the central unit is configured to communicate the generated light emission adaptation command via a corresponding network interface of the central unit to the neighboring lighting module.

7. The lighting system according to claim 2, wherein the neighboring lighting module comprises the command generator.

8. The lighting system according to claim 1, wherein the particular lighting module comprises the installation decision generator.

9. The lighting system according to claim 8, wherein the neighboring lighting module comprises another installation decision generator, and each of said installation decision generators generates the program installation decision to start the installation of the program on the respective programmable controller of the respective lighting module on which the respective installation decision generator is installed.

10. The lighting system according to claim 9, wherein the respective installation decision generators of the particular lighting module and of the neighboring lighting module are configured to communicate with each other via the respective network interfaces of the particular lighting module and of the neighboring lighting module, wherein the installation decision generator of the particular lighting module is configured to send a decision message to the neighboring lighting module when the program installation decision is generated, wherein the installation decision generator of the neighboring lighting module is configured to receive the decision message, and wherein the installation decision generator of the neighboring lighting module is configured to postpone, when the decision message is received, the generation of a respective program installation decision for the neighboring lighting module.

11. The lighting system according to claim 1, wherein the lighting system comprises a central unit, wherein the central unit comprises a corresponding network interface for communicating with at least the plurality of lighting modules via the network and comprises the installation decision generator, and wherein the central unit is configured to communicate the generated program installation decision via the corresponding network interface to the particular lighting module.

12. The lighting system according to claim 1, wherein the operational information comprises information which relates to a capability of the neighboring lighting module to change an amount of light emitted by the respective light source of the neighboring lighting module compared to an actual light emission by the light source of the neighboring lighting module at the moment in time that the operational information is obtained by the installation decision generator, and wherein the installation decision generator is configured to generate the program installation decision only when the operational information indicates that the neighboring lighting module is able to compensate a light emission of the particular lighting module during the installation the program.

13. The lighting system according to claim 1, the lighting system comprising a desired illumination determinator for determining the desired illumination of the portion of the environment,
wherein
   at least one of the particular lighting module or the neighboring lighting module comprises an occupancy sensor for sensing whether people are present in an area illuminated by the light source of the at least one of the particular lighting module or the neighboring lighting module, and
   the desired illumination determinator is configured to adapt the desired illumination (Imin) of the portion of the environment in dependence on information sensed by the occupancy sensor.

14. The lighting system according to claim 13, wherein the desired illumination determinator is configured to provide the desired illumination (Imin) of the portion of the environment to the installation decision generator.

15. The lighting system according to claim 14, wherein the particular lighting module comprises the desired illumination determinator.

16. The lighting system according to claim 14, wherein the neighboring lighting module comprises the desired illumination determinator.

17. The lighting system according to claim 13, wherein the desired illumination determinator is configured to provide the desired illumination (Imin) of the portion of the environment to the installation decision generator and to a command generator for generating a light emission adaptation command for the neighboring lighting module.

18. The lighting system according to claim 13, wherein the lighting system comprises a central unit configured to communicate the generated program installation decision to the particular lighting module and wherein the central unit comprises the desired illumination determinator.

19. A method of starting an installation of a program on a programmable controller of a particular lighting module of a lighting system, the particular lighting module having a neighboring lighting module within the lighting system, the neighboring lighting module being arranged to illuminate together with the particular lighting module a portion of an environment, the method comprising:
   obtaining operational information relating to a light emission operation of the neighboring lighting module;
   generating a program installation decision to start the installation of the program on the programmable controller of the particular lighting module, wherein the generating the program installation decision is based on information, comprising the obtained operational information, to enable illumination of the portion of the environment to be within a pre-determined range or threshold of the desired illumination (Imin) of the portion of the environment during the period of time that the program is being installed; and
   starting the installation of the program on the programmable controller of the particular lighting module in response to the generating the program installation decision.

20. A non-transitory computer readable medium comprising a computer readable program for starting an installation of a given program on a programmable controller of a particular lighting module of a lighting system, the particular lighting module having a neighboring lighting module within the lighting system, the neighboring lighting module being arranged to illuminate together with the particular lighting module a portion of an environment, wherein the computer readable program when executed on a computer causes the computer to perform the steps of:
   obtaining operational information relating to a light emission operation of the neighboring lighting module,
   generating a program installation decision to start the installation of the given program on the programmable controller of the particular lighting module, wherein the generating the program installation decision is based on information, comprising the obtained operational information, to enable illumination of the portion of the environment to be within a pre-determined range or threshold of the desired illumination (Imin) of the portion of the environment during the period of time that the given program is being installed,
   starting the installation of the given program on the programmable controller of the particular lighting module in response to the program installation decision.

* * * * *